April 5, 1966  J. D. HENRICKS ET AL  3,244,456
BRAKE CYLINDER RELEASE VALVE
Filed July 13, 1964  4 Sheets-Sheet 1

Jack D. Henricks
Kenneth D. Swander
INVENTORS.

BY
Scofield, Kokjer, Scofield Lowe
ATTORNEYS.

Jack D. Henricks
Kenneth D. Swander
INVENTORS.

Jack D. Henricks
Kenneth D. Swander
INVENTORS.

BY

*Scofield, Kokjer, Scofield & Lowe*
ATTORNEYS.

Jack D. Henricks
Kenneth D. Swander
INVENTORS.
BY
ATTORNEYS.

United States Patent Office 3,244,456
Patented Apr. 5, 1966

3,244,456
BRAKE CYLINDER RELEASE VALVE
Jack D. Henricks, Kansas City, Mo., and Kenneth D. Swander, Shawnee Mission, Kans., assignors to Gustin-Bacon Manufacturing Company, Kansas City, Mo., a corporation of Delaware
Filed July 13, 1964, Ser. No. 382,022
7 Claims. (Cl. 303—69)

This invention relates to devices known as brake cylinder release valves, the latter conventionally interposed between the control valve and brake cylinder or cylinders of a railway car or other type vehicle using a fluid pressure system.

This invention is an improvement over the valve of McIntyre Patent No. 3,123,408, issued March 3, 1964, entitled, "Brake Cylinder Release Valve."

When depleting the air pressure from the brake pipe of cars in a train such as is the practice in terminal switching, the air brakes are set in either full service or emergency. In order to move cars, it is normally necessary to drain the air from the brake system of each car by means of a reservoir release valve which is uusally a part of the control valve. In order to save time, the brake release valve comprising the subject of the instant invention permits isolation of the brake system from the cylinder and vents the cylinder to the atmosphere with a single pull of the release rod. After the brake system has been recharged to normal pressure, the brake cylinder release valve will reset to reestablish normal communication between the brake system and the brake cylinder.

A principal object of this invention is to provide an improved brake cylinder release valve device directly and mechanically initially actuated whereby to give positive initial manual control of the valvular elements housed within the main valve body as opposed to a pilot operated valve.

Another object of the invention is to provide a brake cylinder release valve meeting all of the specifications of section E–53 of the 1963 Manual of Standards and Recommended Practices of the AAR.

Another object of the invention is to provide a brake cylinder release valve possessing means for limiting the manual operation thereof, which means are dependent upon predetermined conditions in the system.

A further object of the invention is to provide a brake cylinder release valve wherein constant and continuous operation of the limiting features thereof assure safe and dependable operation.

Still another object of the invention is to provide a brake cylinder release valve having means associated therewith operative to indicate malfunction in the event of failure of one or more of the elements within the valve.

A further object of the invention is to provide such a valve having a novel piston arrangement therein with a spool valve telescoped into the piston section which permits gravity draining of all fluid pressures in this section.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

Figure 1:
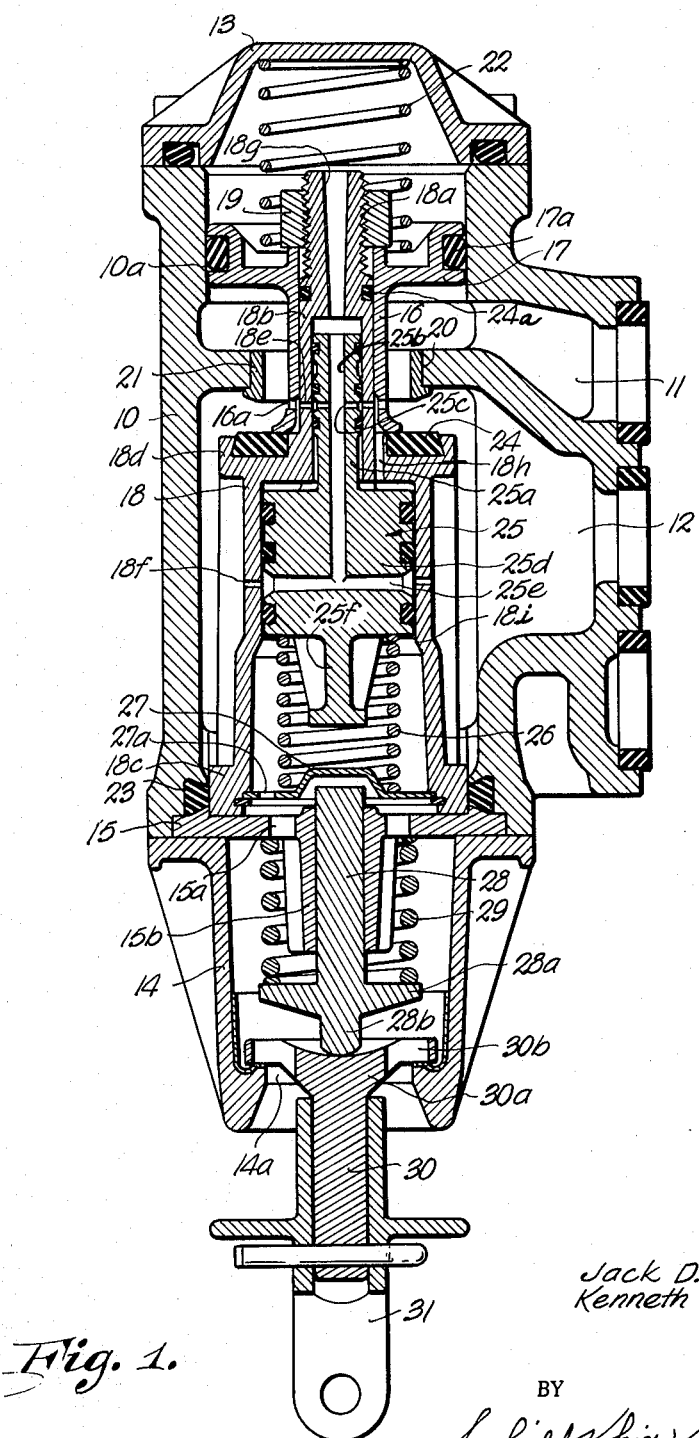
FIG. 1 is a sectional view of the subject brake cylinder release valve in open position (normal) with either no air pressure present or at some pressure level substantially less than 25 p.s.i.

The parts of the valve will first be identified and then the function of the valve and parts thereof in its various types of operation.

The release valve comprises a body 10 into which there is provided a connection 11 from the control valve and another connection 12 with the brake cylinder. The body 10 is open-ended and has end closures 13 and 14 removably attached to the body by means of bolts (not seen). End closure 13 is dome-shaped and is not vented. End closure 14 has lifter guide plate 15 received between itself and body 10, plate 15 vented as at 15a between the legs of the spider mounting lifter guide 15b. The lower end of closure 14 is open as at 14a.

A piston and valve assembly within the body comprises hollow shaft member 16 having an upper piston 17 thereon encircling the upper valve stem 18b of valve 18 whose uppermost end is threaded as at 18a. Nut 19 engages thereon whereby to fix hollow shaft member 16 with respect to the upward valve stem 18b of valve 18. Upper piston 17 has seal O-ring 17a received in a circumferential groove therein adapted to seal against the cylinder wall 10a of housing body 10. Shaft member 16 passes through opening 20 communicating between housing passages 11 and 12 in which is fixed seal bushing 21. A first spring 22 communicates between the underside of dome closure 13 and the upper face of piston 17.

Valve 18 has lower ring flange 18c at the lower end thereof adapted to seal against housing recess received seal O-ring 23 in certain portions thereof and upper flange ring 18d carrying seal gasket 24 in a recess therein adapted to seal against the underside of bushing 21.

Shaft member 16 has circumferentially spaced passages 16a through the lower skirt portion thereof which are positioned to communicate with passages 18e in valve stem 18b. Additional lower passages 18f are formed circumferentially in the enlarged body portion of valve 18. Passage 18g passes downwardly through valve stem 18b. O-ring 24a seals the outside surface of valve stem 18b to the inside surface of hollow shaft member 16. Valve flange 18d has passage 18h through same below openings 18e.

Spool valve 25 (generally designated) has upper shaft portion 25a received in stem 18b having various sealing O-rings in grooves thereon, as well as passage 25b vertically therethrough. Circumferentially spaced passages 25c run normal to passages 25b. Body portion 25d of valve 25 has a plurality of sealing O-rings received in grooves circumferentially thereof and is slidingly received in enlarged hollow body portion 18i of valve 18. Transverse passage 25e crosses the lower end of vertical passage 25b and communicates therewith. Extension 25f is fixed to the lower end of spool valve 25 and depends within spring 26. The latter communicates between the lower end of valve 25 and spring retainer plate 27, the last received in the lower skirt of valve 18 and vented as at 27a.

Valve lifter 28 has the upper cylindrical end thereof received in guide 15b and skirt 28a which receives the lower end of spring 29 whose upper end is received against the lower face of plate 15. The lower end 28b of lifter 28 is received in the upper end of pull rod 30 whose upper skirted end 30a is vented as at 30b and whose lower end is connected into handle member 31.

The function of the valve will now be described with respect to the various views shown in the drawing, sequentially.

(A) *Normal position—FIG. 1*

The brake cylinder release valve, as shown in the normal position of FIG. 1, permits flow from passage 11 through bushing 20 into passage 12, and additionally, to the various passages and cavities of the device as follows:

(1) Air from passage 11 flows through bushing 20, thence through orifices or openings 16a in sleeve 16 and thence through passage 18h in flange 18d to the space above spool valve 25.

(2) Air from passage 11 flows through orifices 16a, thence into orifices 18e of valve stem 18b, thence into passages 25b and 18g and up into the cavity of the dome 13. The pressure above piston 17, that is, in dome 13, coupled with the action of spring 22, tends to retain piston 17 at its lowermost position as seen in FIG. 1 whereby there is no seal between gasket 24 and the lower end of bushing 20, while the flange 18c is sealed against gasket 23. It should also be noted that openings 18f line up with passage 25e, as well as the lining up of passages 16a, 18e and 25c. Since flange 18c is cooperating with gasket 23 to bar access of air to openings 15a, passage of air is either from passage 11 to passage 12, to the space above piston 25 or up into dome 13. This means that, so long as the pressure exerted above piston or spool valve 25 is less than a predetermined pressure of say, 25 p.s.i., the spool valve will remain virtually in the position shown.

(3) As the pressure increases to overcome the spring pressure of spring 26 (typically 35 p.s.i. or greater) on piston 25, as during a service or emergency brake application, this valve moves against spring 26 so that the spool valve ports 25c are blocked off from communication with passages 18e and 16a, and additionally, air is exhausted from dome 13 through passages 18g, 25b and 25e as passage 25e approximates the outwardly flaring lower portion of valve 18 at 18i. At pressures below 35 p.s.i. and above 25 p.s.i. the piston 25 floats with passage 25e dead (noncommunicating) between passage 18f and the skirt flare. With air exhausted from dome 13 the effective opposing piston area of piston 17 re passage 11 and zone 18c of valve body relative to passage 12 are equal, that is, the bore diameters receiving parts 17 and 18c are equal. The piston-valve assembly is balanced, whereby to permit tripping of the valve. Thus we reach the position of FIG. 2 and position 2. Suitable means are employed to retain the lower O-ring on piston 25 in its groove.

Figure 2:
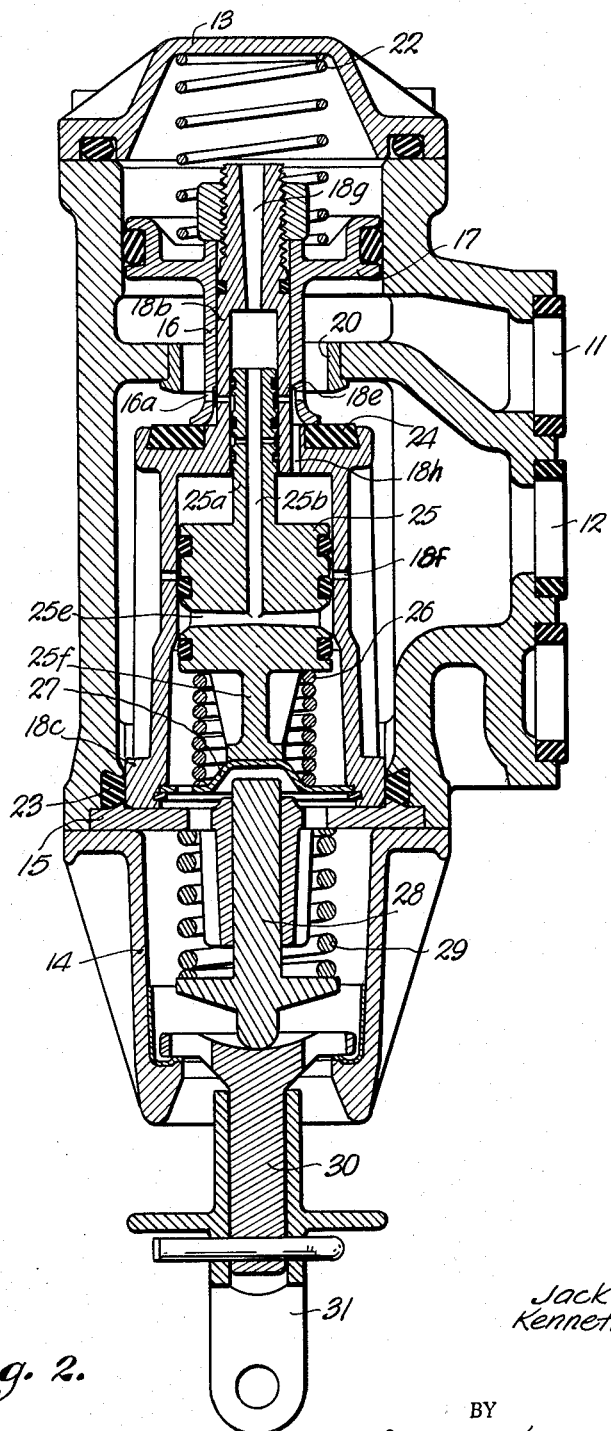
FIG. 2 is a like view to that of FIG. 1 but showing the subject valve in balanced position with air pressure in the control valve line at some predetermined level, for example, above 35 p.s.i., present.

(B) *Balance position—FIG. 2*

With fluid pressure in passages 11 and 12, exceeding 35 p.s.i., the main piston-valve assembly (piston 17 and valve 18) is balanced with the pressure on the lower side of piston 17 and the pressure on the upper projected area of valve 18 (flange 18d, gasket 24 and the skirt of sleeve 16) balancing one another out. Seal ring or flange 18c still acts as a radical seal against gasket 23 on the cylindrical base of valve 18 and the lower exhaust seat or plate 15. Spring 22 exerts downward pressure whereby to maintain sealing pressure on the radial compressed seal or gasket 23.

Figure 3:
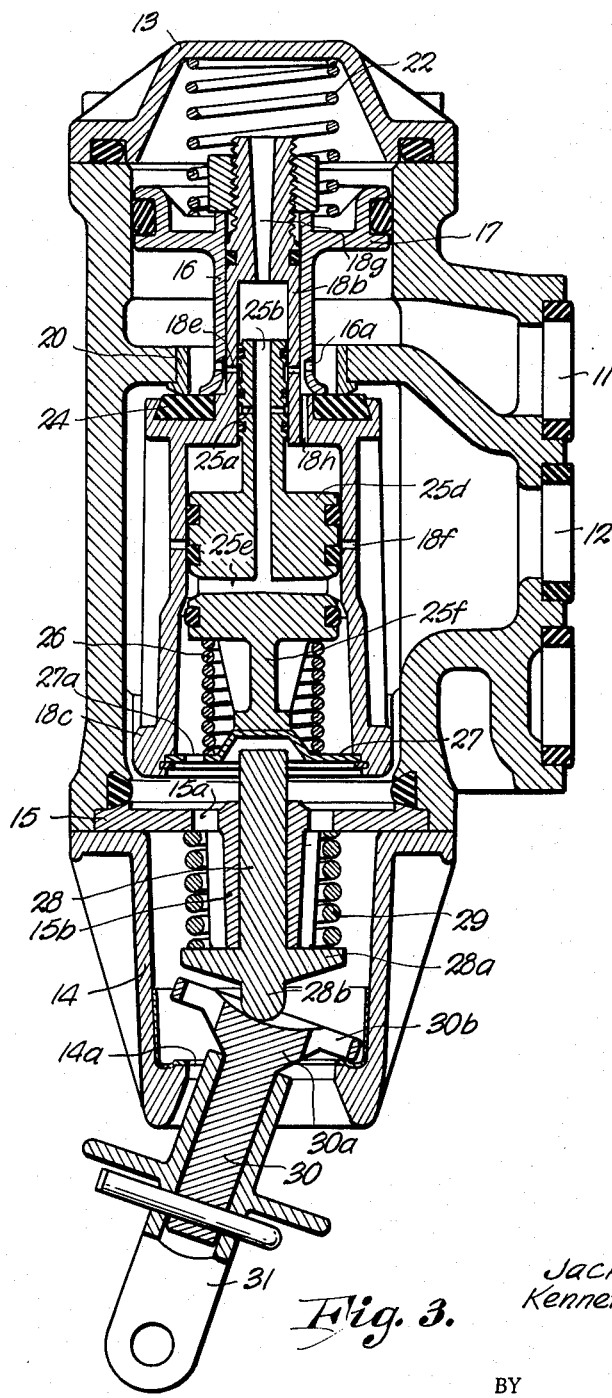
FIG. 3 is a like view to those of FIGS. 1 and 2 but shows the subject valve in tripped position with air pressure above said predetermined level present.

(C) *Tripping the valves and tripped position—FIG. 3*

Under the conditions described with respect to the last figure, manual movement of the handle 31 raises valve lifter 28, which in turn abuts the recess in spring retainer plate 27 thus exerting force on valve 18. As valve 18 is moved upwardly, the seal is lost between flange 18c and gasket 23 whereby air exhausts from passageway 12 out through openings 15a, 30b and 14a. Further, as valve 18 rises, gasket 24 approaches and seats on the underside of bushing 20 thereby causing sealing off of passage 11 from passage 12 at this seat. Air pressure on piston 17 is opposed by the force of spring 22 and such air pressure as is effective through bushing 20 on the skirt of sleeve 16 and a portion of gasket 24. Spool valve 25 remains in the lower position within valve 18 under the influence of air pressure above 35 p.s.i. which is available from passage 11 through openings 16a and 18e to the top of spool valve piston 25. Piston 25 is continuously in communication with pressure from chamber 11.

In the tripped position of FIG. 3, with pressure above a predetermined value of 35 p.s.i., fluid pressure from the control valve in passage 11 is retained and brake cylinder pressure in passage 12 is exhausted to atmosphere as noted above. All moisture is free to drain by gravity from the valve thus assuring freedom from cold weather freeze-up.

Figure 4:
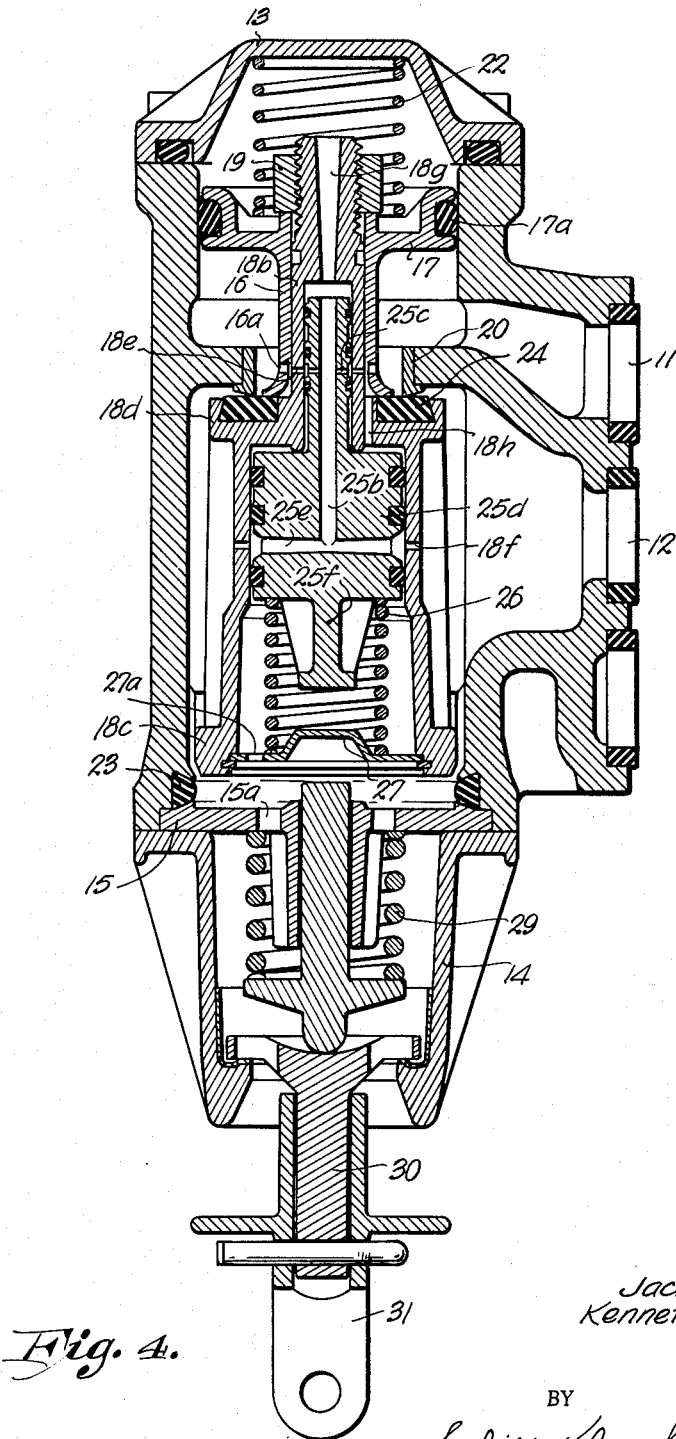
FIG. 4 is a view similar to those of FIGS. 1–3, inclusive, but shows a valve in reset operation and a fourth position with less than a second predetermined pressure, say 25 p.s.i. pressure, in the control valve line.

(D) *Reset operation position No. 4—FIG. 4*

(1) With the brake pipe recharged to normal air pressure and the control valve in release position, fluid pressure will be exhausted out the open retainer pipe and value in a conventional manner and pressure will be drawn from passage 11 of the brake cylinder release device. As pressure gradually lowers in passage 11, spool valve 25 responds to this pressure change under the action of spring 26, thereby rising to reestablish the correspondence of passages 16a, 18e and 25c, as well as passageways 18f and 25e.

Residual fluid pressure is vented via passage 25b without appreciable pressure build-up in dome 13. The spring force exerted by spring 22 is sufficient to return the assembly to normal position thus completing the cycle.

(2) With the brake system arranged to provide 20 p.s.i. retained in the brake cylinder as determined by the retainer valve setting for grade braking when the brake is cycled on and off, the brake cylinder release valve device will function as follows to reset.

As pressure is restored in the brake pipe to effect a brake release in the control valve, fluid pressure will be exhausted out the retainer pipe to the retainer valve until a pressure of 20 p.s.i. is reached, as determined by the spring in the retainer valve. A residual volume of air at 20 p.s.i. will then be present at passage 11 of the brake cylinder release valve. The spool valve 25 (piston) senses this pressure change in the space above spool valve 25 (through openings 18h and 16a). Spool valve 25 then tends to assume an intermediate position cutting off the flow of pressure past the O-ring below passage 25e. Thereafter, the flow connections of passages 16a, 18e and 25c, as well as the flow connection of orifices 18f with passage 25e are reestablished whereby air flows again through passages 25b and 18g to atmosphere and inadvertently to dome 13. This provides a controlled rate of pressure blowdown from passage 11 as opposed to a fast release thereof. This permits dissipation of residual air trapped in passage 11 without causing inadvertent operation of the brake cylinder due to pressure build-up in passage 12, for example, at some low value above 5–7 p.s.i. which would cause brake cylinder piston travel and setting of the brake. Passages 25b and 25e may be enlarged and passage 18g orificed down at its lower end to insure a minimum use of pressure in dome 13 before the pressure falls in line 11 to approximately 3–4 p.s.i. Since the brake cylinder return spring requires 5 pounds to overcome it, that is, the pressure at which normally expect 4 inches of piston travel and the shoes to set against the wheel, it is important that the pressure be depleted at a slow rate to insure complete draining of all passages. At a predetermined low pressure of typically 3 to 4 p.s.i., the force of spring 22 is sufficient to overcome the differential force of piston 17 minus the effective area of seat 24 and return the valve assembly 18 to normal position thus completing the cycle.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. In a brake cylinder release valve, the combination of a hollow housing having end closures,
   a first piston receiving chamber in the hollow housing,
   a connection for a brake controlling device communicating into said first housing chamber,
   a second chamber in the hollow housing,
   a connection for a brake cylinder communicating into said second housing chamber,
   means in said hollow housing dividing the first and second housing chambers from one another and having a restricted opening therethrough,
   piston sealing means in said first housing chamber reciprocable in sealing fashion within said chamber,
   a valve body in said second housing chamber reciprocable within said chamber,
   piston rod means connecting said piston sealing means and said valve body to form a valve body-sealing means assembly and extending through said restricted opening and of insufficient diameter to seal same,
   said valve body and housing portion forming said second chamber so configured as to contact one another in sealing fashion within said second chamber only when the assembly is in a normal or open position,
   whereby to form a flow passageway through said hollow housing communicating between said connections and between opposed portions of said piston sealing means and said valve body when the assembly is in a normal or open position,
   means on said valve body for sealing said restricted opening when the assembly is moved to an abnormal or closed position,
   spring means in the hollow housing normally urging the assembly away from said closed position to said open position,
   the housing portion forming the first chamber on the side of the piston sealing means away from the restricted opening being sealed,
   pull means engageable with the assembly for overcoming the force of the spring means and moving the assembly toward closed position,
   the housing portion of the second chamber continuously vented to atmosphere on the side of the valve body away from the restricted opening,
   said valve body and piston rod each at least partially hollow and receiving therewithin a spool valve reciprocable in wall sealing fashion within at least a portion of said hollow valve body and piston rod,
   the portion of said spool valve in said valve body of greater diameter whereby to comprise a piston portion thereof,
   a first flow passage through said piston sealing means into the portion of said piston rod containing said spool valve,
   a second flow passage through a portion of said spool valve including a portion thereof received in said piston rod and a portion thereof received in said valve body,
   a third passage communicating from said second passage outwardly of said spool valve portion in said piston rod,
   a fourth passage in said piston rod connectable with said third passage at a certain position of said spool valve,
   a fifth passage in said spool valve piston portion communicating outwardly of said piston portion,
   and a sixth passage in said valve body connectible with said fifth passage at a certain position of said spool valve with respect to said valve body.

2. A valve as in claim 1 wherein said passages outwardly of said spool valve connect with the piston rod and valve body passages at the same position of said spool valve.

3. A valve as in claim 1 including spring means within said valve body tending to position said spool valve in one position within said valve body.

4. In a brake cylinder release valve, the combination of a hollow housing having end closures,
   a first piston receiving chamber in the hollow housing,
   a connection for a control valve device communicating into said first housing chamber,
   a second chamber in the hollow housing,
   a connection for a brake cylinder communicating into said second housing chamber,
   means in said hollow housing dividing the first and second housing chambers from one another and having a restricted opening therethrough,
   piston sealing means in said first housing chamber reciprocable in wall sealing fashion within said chamber,
   the first chamber being fluid tight on the side of the piston sealing means away from the restricted opening,
   a valve body positioned within said second housing chamber and reciprocable therein from one extremity thereof to the other,
   means on said valve body for sealing said restricted opening when the valve body is moved to one extremity of said chamber,
   means on said valve body for engaging in wall sealing contact with the second housing chamber inner wall surface when moved to the other extremity of said chamber,
   a rod connecting said valve body with said piston sealing means to form a piston-valve body assembly and extending through said restricted opening and of insufficient outer diameter to seal same,
   whereby to form a flow passageway through said hollow housing communicating between said connections and between opposed portions of the piston and valve body when the piston-valve body assembly is in a normal or open position where the valve body does not seal said restricted opening and does sealingly contact said second chamber inside wall portion,
   the second chamber continuously vented to atmosphere on the side of the valve body away from said restricted opening,
   spring means in the hollow housing normally urging the piston-valve body assembly away from an abnormal or closed position wherein the valve body seals said restricted opening with a portion thereof,
   pull means engageable with the piston-valve body assembly for overcoming the force of the spring means in moving the piston assembly to closed position,
   means interiorly of the valve body and rod interconnecting the first chamber on the side of the piston sealing means away from the restricted opening with said first and second chambers so long as the pressure in the control valve connection remains below a certain level, and
   additional means received interiorly of the valve body and rod for venting the first chamber on the side of the piston sealing means away from the restricted opening when the pressure in the control valve connection rises above a certain level.

5. A valve as in claim 4 wherein the means for venting the first chamber on the side of the sealing means away from the restricted opening when the pressure in the control valve connection rises above a certain level also closes said connections with said first and second chambers.

6. Apparatus as in claim 4 wherein the means for said interconnecting or venting comprises a spool valve received in said valve body and rod, and flow line connections in said rod, spool valve and valve body whereby pressure changes in said control valve connection are transmitted to said spool valve causing same to assume different positions in said rod and valve body and interconnect or vent said sealed portion of said first chamber.

7. Apparatus as in claim 6 including resilient means tending to retain said spool valve in a nonventing position within said valve body.

No references cited.

EUGENE G. BOTZ, *Primary Examiner.*

M. S. SALES, *Assistant Examiner.*